US009568632B2

(12) United States Patent
Stolarczyk et al.

(10) Patent No.: US 9,568,632 B2
(45) Date of Patent: Feb. 14, 2017

(54) PRACTICAL ELECTROMAGNETIC GRADIOMETER

(71) Applicant: Stolar Research Corporation, Rio Rancho, NM (US)

(72) Inventors: Gerald Lee Stolarczyk, Placita, NM (US); Tito Sanchez, Rio Rancho, NM (US); Chance Dain Valentine, Raton, NM (US); Ernest M. Salazar, Rio Rancho, NM (US); Beaux L. Beard, Rio Ranch, NM (US); John G. Howard, Rio Rancho, NM (US); Brecken H. Uhl, Las Cruces, NM (US)

(73) Assignee: Stolar, Inc., Raton, NM (US)

( * ) Notice: Subject to any disclaimer, the term of this patent is extended or adjusted under 35 U.S.C. 154(b) by 129 days.

(21) Appl. No.: 14/477,090

(22) Filed: Sep. 4, 2014

(65) Prior Publication Data

US 2014/0368196 A1   Dec. 18, 2014

(51) Int. Cl.
*G01V 3/12* (2006.01)
*G01V 3/15* (2006.01)

(52) U.S. Cl.
CPC .. *G01V 3/12* (2013.01); *G01V 3/15* (2013.01)

(58) Field of Classification Search
CPC ............... G01V 3/12; G01V 3/15; G01V 3/16
USPC ....... 324/329, 330, 332, 334, 337, 344–345; 342/22, 25, 27, 195
See application file for complete search history.

(56) References Cited

U.S. PATENT DOCUMENTS

| | | | | |
|---|---|---|---|---|
| 7,535,407 B2 * | 5/2009 | Cloutier | ................... | G01V 3/15 324/326 |
| 7,675,289 B1 * | 3/2010 | Stolarczyk | ............... | G01V 3/15 324/334 |
| 2008/0218170 A1 * | 9/2008 | Stolarczyk | ............... | G01V 3/17 324/330 |
| 2012/0133543 A1 * | 5/2012 | Al-Khalefah | ............. | G01S 7/03 342/22 |

* cited by examiner

*Primary Examiner* — Tung X Nguyen
*Assistant Examiner* — Neel Shah
(74) *Attorney, Agent, or Firm* — Richard B. Main; Main Law Cafe (57) ABSTRACT

An electromagnetic gradiometer (EMG) survey kit includes a lightweight man-carry boom about ten feet long. Matched magnetic dipole antennas are attached at each end and connected to a differential EMG receiver able to make measurements in the picoTelsa range. A pair of staging tripods allow the man-carry boom to be prepared for field use and assist the user in positioning themselves under a shoulder sling. An air core transmitter loop antenna and a low frequency square wave generator are spotted nearby a survey on the ground surface. Its emissions will illuminate any underground conductive structures with primary electric field waves. These in turn will reradiate near field magnetic waves that can be detected by the EMG receiver while walking around in a search area on the ground surface. GPS navigation receivers are used to locate and log the changing positions of the EMG receiver and stationary loop transmitter.

10 Claims, 9 Drawing Sheets

PRACTICAL ELECTROMAGNETIC GRADIOMETER

FIELD OF THE INVENTION

The present invention relates to electromagnetic gradiometer (EMG) measuring devices, and more particularly to practical implementations that can be used by individuals in the field to find and locate wires and other conductive structures buried in clays, silts, and sands hundreds of feet deep.

BACKGROUND DESCRIPTION

Wires and other conductive structures excited by alternating currents and radio fields generally will re-radiate electromagnetic fields that include an electric component and a magnetic component. The electric fields are detectable at great distances, and the magnetic fields are not. The magnetic fields provide a finer source location detail that is very helpful in some applications. The electric fields need to be screened-out to read those finer details.

If the electric field is not too strong at a reception point, it can be screened out completely by a shield screen cage or shield. A ferrite loop antenna inside that cage will only see, and can be used to measure, the magnetic field.

At short ranges, e.g., less than several hundred feet, the concentric lines of force in the magnetic field emitted by wires and other conductive structures can be measured and compared between two magnetic dipole antennas with a short separation distance between them.

Conventional electromagnetic gradiometers (EMG) have used a left hand wound (LHW) and a right hand wound (RHW) horizontal magnetic dipole (HMD) antenna at each end of a twenty foot pole to automatically cancel the electric field and measure the magnetic gradients. The HMD antennas are matched, coaxial, and connected together such that the plane waves they receive from far away will cancel out one another. Any differences in measurements the combination produces will be solely due to the magnetic field differences caused by a local scattering object.

If a radiating wire or conductor is buried underground, two magnetic dipole antennas of an EMG searching above on the ground surface will produce measurements characteristic of their relative positions and orientations. The changes observable over small distances can be dramatic.

Whenever an EMG is relatively close to the radiating wire or conductor, the concentric magnetic lines of force will curve tight enough to be measurable in comparison. Even at ten feet of separation of the antennas. As the EMG receiver moves closer to the target, the magnetic curvatures will get still tighter due to their concentric spreading. The best EMG measurements will therefore be made when the axis of the EMG is orthogonal to the general run of the wire or other conductor underneath.

In practice, the construction and use of an EMG receiver is not so simple. Empirical studies have been needed to find the best ways to excite the underground wires and other conductive structures, what frequencies to use, what power levels, what stand-off distances are needed between transmitters and receivers, what antenna types are best in various situations, and how all these should be varied when the sols comprise clay, silts, sands, cobbles, or other combinations, and when the depths of interest range from a few feet to several hundred feet.

SUMMARY OF THE INVENTION

Briefly, a practical electromagnetic gradiometer embodiment of the present invention for finding and locating buried wires and other conductive structures from the ground surface comprises a lightweight boom about ten feet long carried by a user on foot with a shoulder sling. Two magnetic dipole antennas are used and mounted at each end of the boom, one forward of the user and one aft. A receiver mounted to the boom near the center in front of the user includes a small tablet computer. If a commercial AM broadcast station is not nearby, a transmitter may be placed on the ground nearby to electrically illuminate the underground area with unmodulated continuous wave (CW) radio carriers generally less than 1500-kHz. The soil conductivity dictates the best CW frequencies and powers to use, and limits the depths that can be search for wires and other conductive structures. Several receiver and transmitter antenna combinations are possible, and the best ones to use are selected by the user according to soil conditions, local interference, and target size.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
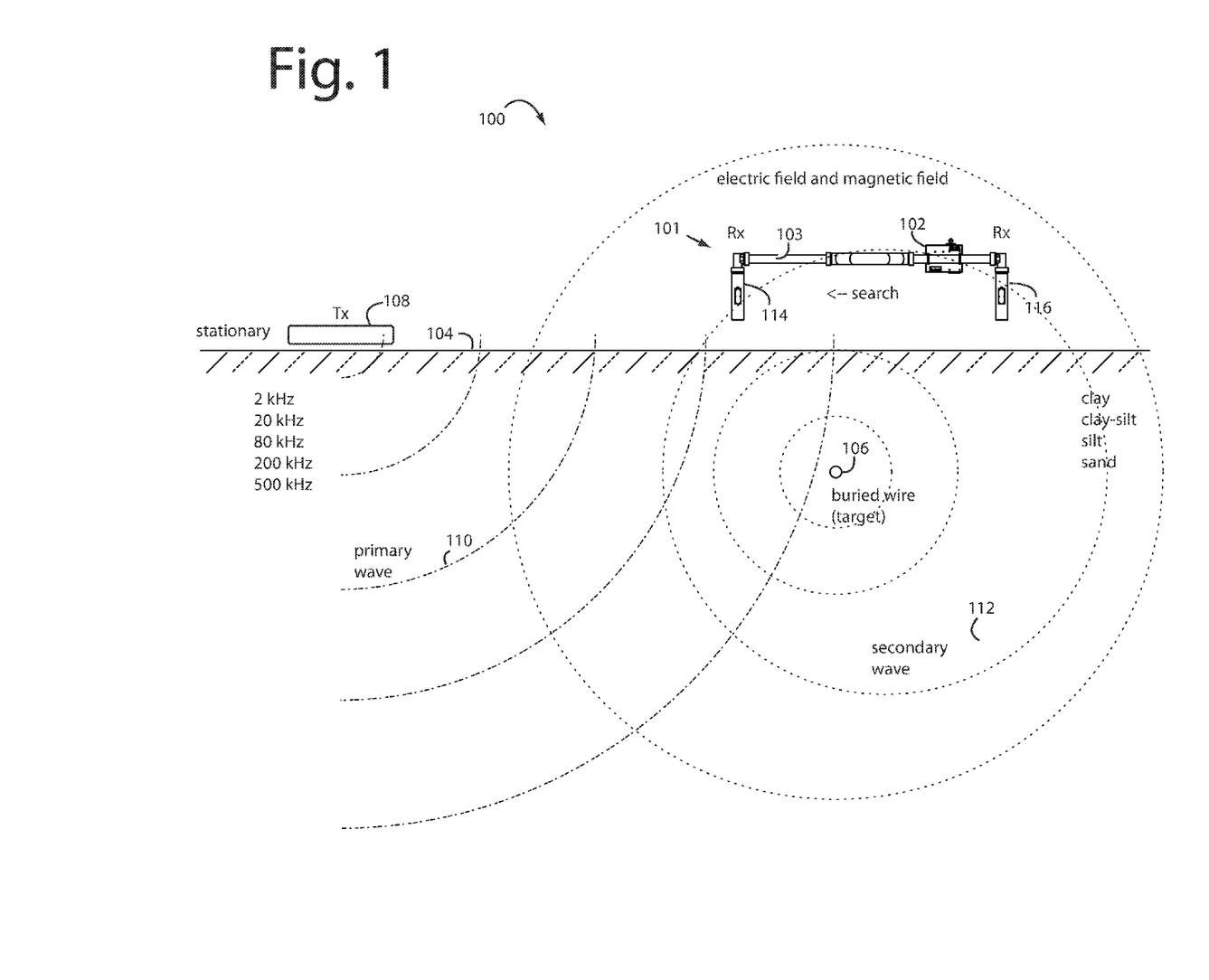
FIG. 1 is a cross sectional view of a ground surface area under which a buried wire target is present. A stationary transmitter is represented as laying on the ground surface and radiating primary radio waves into the ground. The buried wire target is represented as re-radiating those as secondary radio waves able to break through the ground surface. An EMG receiver is represented as searching from the right to the left in the illustration.

FIG. 1 represents an electromagnetic gradiometer (EMG) survey system embodiment of the present invention, and is referred to herein by the general reference numeral 100. EMG survey system 100 comprises a man-carry unit 101 with an EMG receiver 102 configured to be carried by a user with a shoulder sling slung boom 103 on foot over a ground surface 104. The objective is to find and locate any buried wires or other conductor targets 106 from above the surface 104.

The soils beneath the surface 104 typically comprise clays, clay-silt mixtures, silts, cobbles, and sands. The soil conductivities can vary as a result. A continuous wave (CW) transmitter 108 is laid on the surface 104 and operated to generate primary waves 110 at typical frequencies of 2 kHz, 20 kHz, 80 kHz, 200 kHz. A typical loop antenna included in CW transmitter 108 can have a thirty inch diameter or a ten foot diameter, depending on the frequencies and power levels needed in view of the soil conductivity encountered.

High frequency primary waves 110 in the 500-1500 kHz AM-radio band may already be present in the survey area, and transmitter 108 may not be needed. Such result from standard AM radio broadcasts. The locations of transmitter 108 and EMG receiver 102 are typically calculated by mobile GPS navigation receivers and the results are automatically logged with the receiver data.

Transmitter 108 comprises a loop antenna on the order of thirty inches in diameter and a square wave generator that switches a few to several amps of DC-battery current to generate an alternating current. Transmitters 108 come in several different frequency ranges that match the EMG receiver ranges. Both the transmitter 108 and EMG receiver 102 use rechargeable 12-volt batteries to allow them to be portable and mobile.

Whenever a primary wave encounters any buried wires or other conductor targets 106, it will re-radiate secondary waves 112. These secondary waves 112 will include both electric field and magnetic field components. The EMG receiver 102 is configured to reject the electric field component and to measure the magnetic field components as they appear at front and rear magnetic dipole antennas 114 and 116. The two in combination provide a kind of stereoscopic view of buried wires and conductor targets 106.

The proper separation distances to use between the transmitter 108 and receiver 102 depend on the operating frequency, 2 kHz, 20 kHz, 80 kHz, or 200 kHz. There is no limit to the range of frequencies applied, though frequencies below 1.5 MHz usually produce the best results with deep targets. The following Table reports the optimal separation distances versus the frequency of operation that were obtained after field tests between particular transmitters and receivers. The readings were taken with a vertical type transmit loop antenna laid flat, windings parallel to the ground surface. The transmitter control box was set to its maximum loop current output power.

For example, when using EMG survey system 100 in its 200-kHz mode, the 30" transmitter 108 should be placed approximately 150-feet away from where a VMD type EMG receiver 102 will be used.

Typical Transmitter to Receiver Separation Distances

| TX loop size | operating frequency | TX loop Current (amps) | HMD type Rx ant to TX Separation (feet) | VMD type Rx ant to TX Separation (feet) | magnetic field level (dB) |
| --- | --- | --- | --- | --- | --- |
| 30" | 2 kHz | 2.6 | 400' to 450' | 450' to 500' | 125 |
| 30" | 20 kHz | 2.75 | 300' to 350' | 350' to 400' | 125 |
| 30" | 80 kHz | 2.25 | 50' to 100' | 100' to 150' | 125 |
| 10' | 80 kHz | 1.75 | 75' to 125' | 150' to 200' | 125 |
| 30" | 200 kHz | 1.25 | 75' to 125' | 150' to 200' | 125 |
| 10' | 200 kHz | 1.4 | 125' to 175' | 175' to 22'5 | 125 |

Figure 2A:
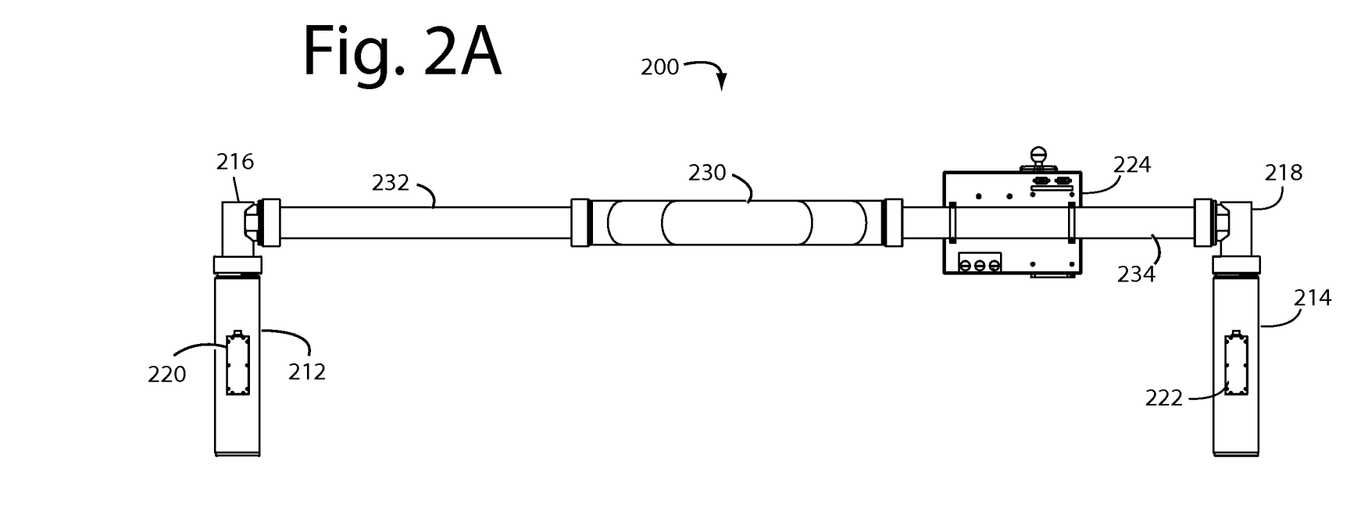
FIGS. 2A-2C are side view of a vertical magnetic dipole antenna equipped EMG receiver, another side view of the same EMG receiver equipped with horizontal magnetic dipole antennas, and a perspective view of the same EMG receiver equipped with the vertical magnetic dipole antennas.
Figure 2B:
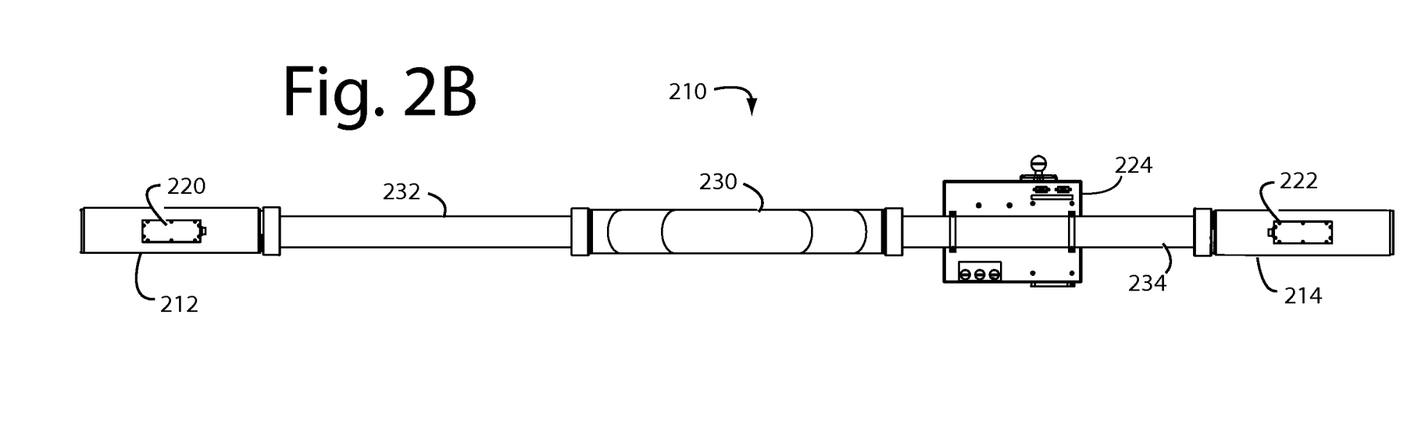
Figure 2C:
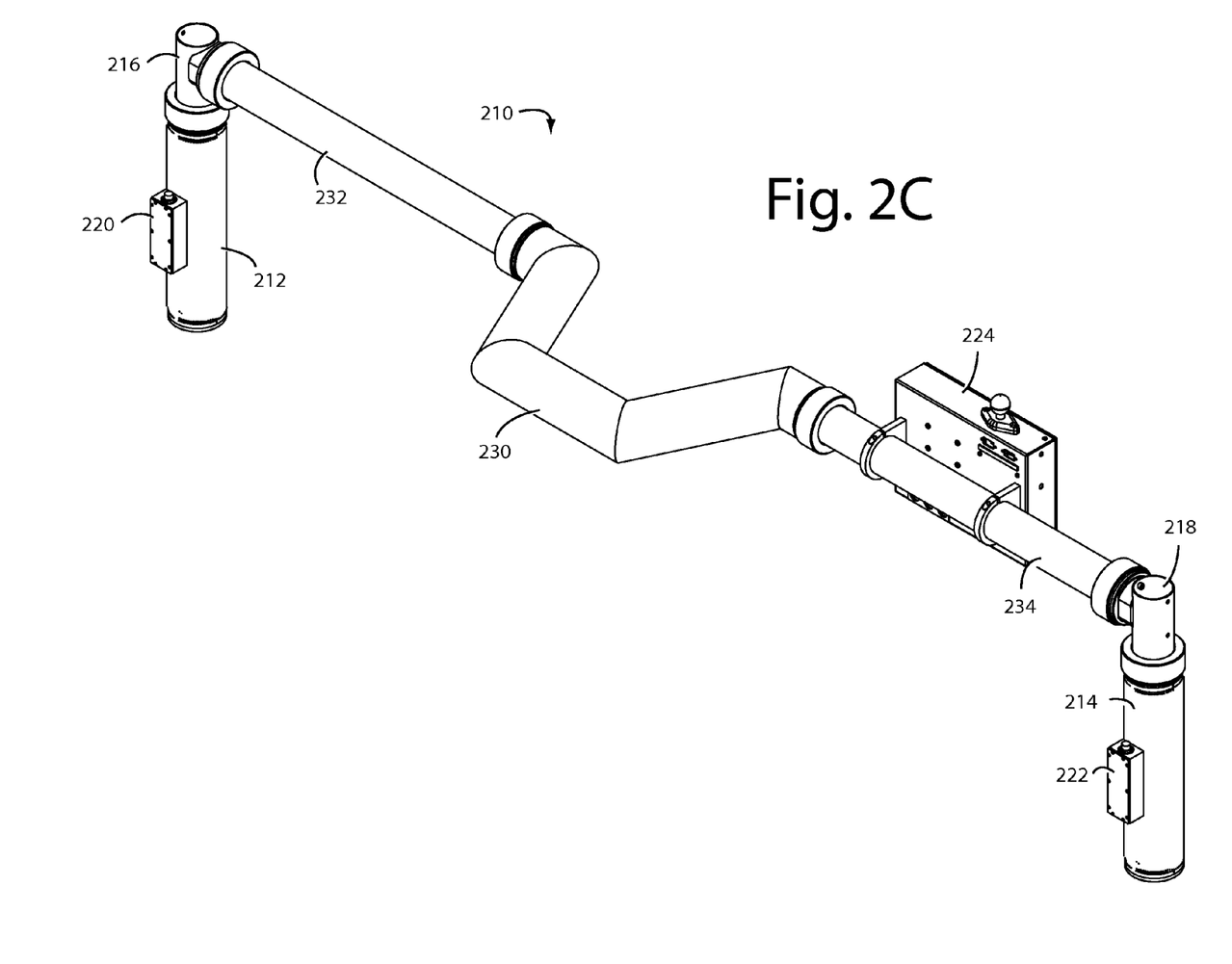

FIGS. 2A-2C represent two major modes of EMG reception, one using vertical and the other using horizontal pairs of magnetic dipole antennas. Difference measurements between each pair provide important information about the relative position, fore and aft, of buried wires and other conductor targets 106.

FIG. 2A represents a vertical magnetic dipole antenna type of EMG receiver 200. FIG. 2B represents a horizontal magnetic dipole antenna type of EMG receiver 210. Both include a leading magnetic dipole antenna 212 and a trailing magnetic dipole antenna 214. Both are actually the same, and the term "leading" and "trailing" refers only to which one the user carries in front and back as they walk during a search. In fact, the magnetic dipole antennas 212 and 214 are matched with one another to provide the same responses to magnetic field inputs.

A pair of pipe elbows 216 and 218 are all that is needed to transform horizontal magnetic dipole (HMD) antenna type of EMG receiver 210 into vertical magnetic dipole (VMD) antenna type of EMG receiver 200, and back.

Each magnetic dipole antenna 212 and 214 includes a corresponding low-noise amplifier (LNA) 220 and 222. These are each cabled to an electronics box 224. Connectors are used so that different frequency range horizontal magnetic dipole antennas can be swapped in and out. In one embodiment, there are three kinds available, low frequency (LF), medium frequency (MF), and high frequency (HF). For example, 20 kHz or 80 kHz, 200 kHz, and 500 kHz to 1700 kHz.

Both types include a swayback center section 230 (seen best in FIG. 2C) that allows the center of gravity to be balanced comfortably with a user shoulder strap and sling. A pair of telescoping sections 232 and 234 allow the whole to be packed up and transported. The shoulder strap used to sling the whole EMG receiver 200 or 210 is not shown. The total weight carried by a user is on the order of thirty five pounds. Lightweight plastics and carbon-fiber composites are used where possible.

The main purpose of sections 230, 232, and 234 are to provide stiff support and fixed relative positioning and separation of magnetic dipole antennas 212 and 214. Very little to no droop is required to keep the magnetic dipole antennas 212 and 214 coaxially aligned in the horizontal mode (FIG. 2B) and parallel to each other in the vertical mode (FIGS. 2A and 2C).

In general, each EMG man-portable unit's antenna array consists of a left magnetic dipole (LMD) antenna and a right magnetic dipole (RMD) antenna. In one configuration, the LMD and RMD antennas operate in differential mode. For maximum primary wave 112 and secondary wave 112 electric field cancellation, the antennas are coaxial, which means that the axes of both antenna pods are aligned along the same axis. The antennas are ideally carried forward on the surface a baseline orthogonally over the general run of the wire target's length.

Figure 3:
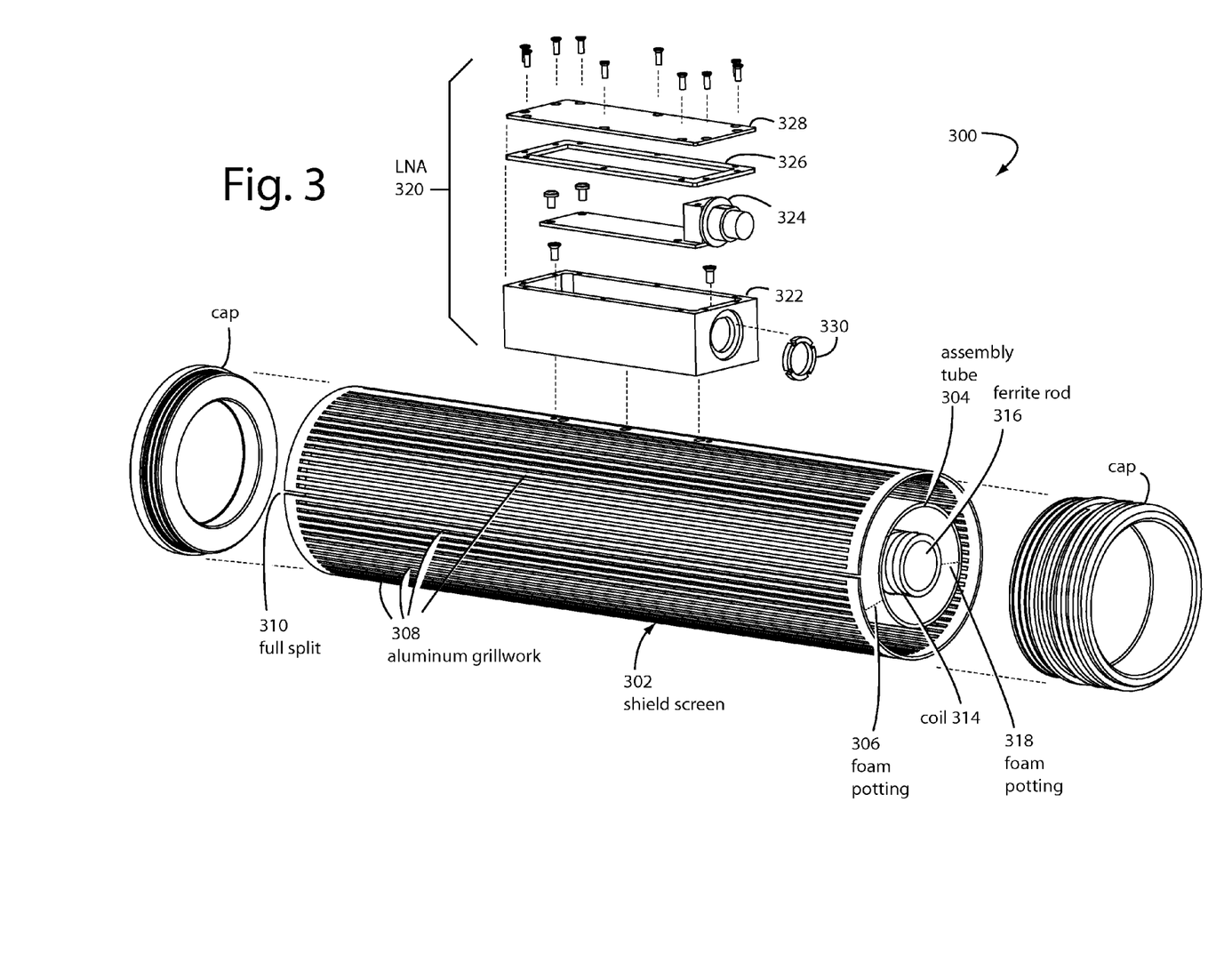
FIG. 3 is an exploded assembly view of the EMG receiver antennas of FIGS. 1 and 2A-2C showing their ferrite rod cores and low noise amplifier (LNA) side mounted modules.

FIG. 3 represents the typical construction of a magnetic dipole antenna 300 in one embodiment of the present invention.

A shield screen 302 begins in manufacturing as an aluminum tube in which an inner plastic assembly tube 304 is completely potted in place, e.g., with a 2-part expanding polyurethane foam filling 306. A computer numeric controlled (CNC) machine is used to cut numerous parallel, longitudinal slots 308 all around through only the aluminum metal to form a grillwork. At least one complete slice end-to-end by the CNC machine creates a full split 310 that prevents shield screen 302 from "shorting out" a ferrite loop antenna 312 that will be potted inside with more foam.

Ferrite loop antenna 312 comprises a coil 314 wound directly on a ferrite rod 316 about one inch in diameter and twelve inches long. Ferrite loop antenna 312 is fully disposed coaxially inside plastic assembly tube 304 and completely potted, e.g., with a 3-pound foam 318. The result is a rugged, hermetically sealed, non-serviceable unit.

Two examples of different types of ferrite cores and three different coil winding schedules over coil form 304 are used in three different frequency range models according to the following Table.

| Magnetic Dipole Antenna Schedule | | | | | |
|---|---|---|---|---|---|
| Frequency Range | ferrite core | form dimensions | coil length | coil turns | #22 mag. wire |
| LF | MN60 | 1.00" × 12" | 10" | 97 | 10 TPI |
| MF | C2025 | 1.00" × 12" | 9" | 181 | 20 TPI |
| HF | C2025 | 1.00" × 12" | 11" | 67 | 6 TPI |

Type MN60 and C2025 ferrite cores by Ceramic Magnetic, Inc. (Fairfield, N.J.), are used. Type MN60 is a manganese-zinc ferrite core with a permeability, $\mu \approx 6500$, and C2025 is a nickel-zinc ferrite core with a permeability, $\mu \cong 175$. At least one embodiment uses a CMD505 core for the HF version.

The whole cylindrical antenna assembly is wrapped with 2" wide e-glass tape and epoxy resin and hardeners. Such provides a hermetic seal and protection in the field from rough use.

The magnetic wire coils 314 are connected inside to a low-noise amplifier (LNA) assembly 320. An LNA housing 322 is fastened to the side of shield screen shield 306. A LNA circuit board and coax connector 324 fit inside and are hermetically sealed with a gasket 326 and a cover 328. A nut 330 secures the coax connector.

Figure 4A:
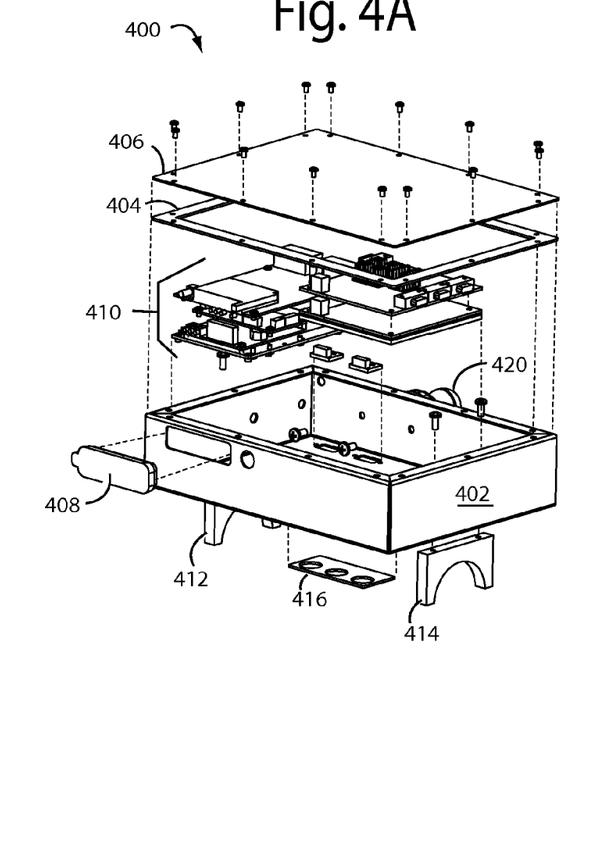
FIGS. 4A and 4B are an exploded assembly view of the EMG receiver box seen in FIGS. 1 and 2A-2C.
Figure 4B:
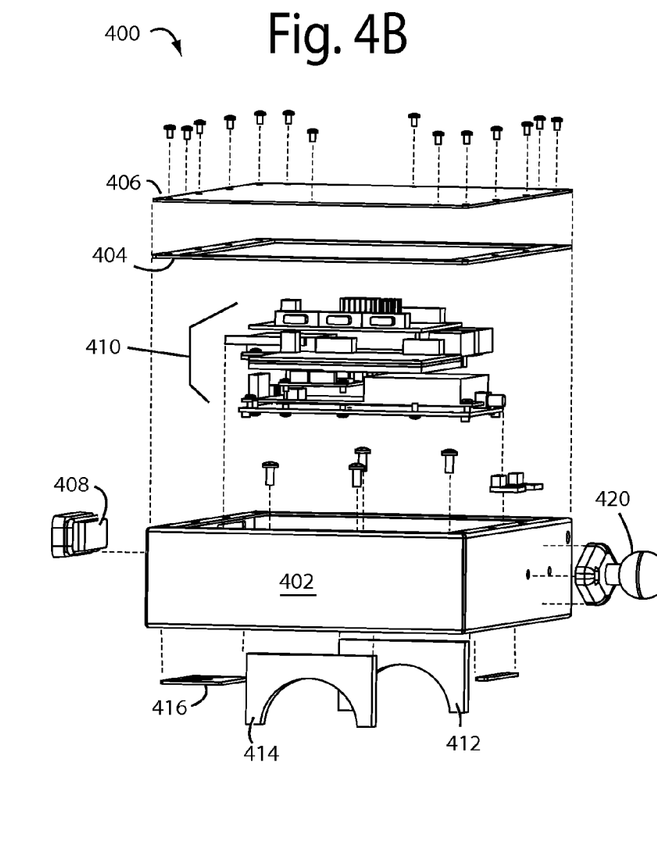

FIGS. 4A and 4B illustrate an electronics box 400 that mounts like electronics box 224 does in FIGS. 2A-2C to section 234. Electronics box 400 includes a main housing 402 hermetically sealed by a gasket 404, a cover 406, and a rubber plug 408. Inside is mounted an electronics assembly 410. A pair of saddles 412 and 414 facilitate mounting to a round pipe section. A wiring seal 416 mounts between the saddles.

A ball mount 420 is fastened to the top in easy sight and reach of a user that has EMG receiver 200 slung over their shoulder. Ball mount 420 is used to support a PDA tablet 512 (FIG. 5).

The electronics assembly 410 includes a software defined radio (SDR) capable of up to eight antenna inputs including magnetic dipoles, electric dipoles, and electric monopoles. SDR can process up to twelve simultaneous signals from 2-kHz up to 7-MHz. An optional compact flash (CF) is used for data file redundancy. An optional 900-MHz radio is used for remote data logging or remote real time data analysis. Inertial navigation can be provided by a built in or external inertial management unit (IMU). Alternatively, a laser prism can be used with a survey total station tool to provide high accuracy positioning. A type BB2590 battery provides for more than eight hours of continuous use.

Figure 5:
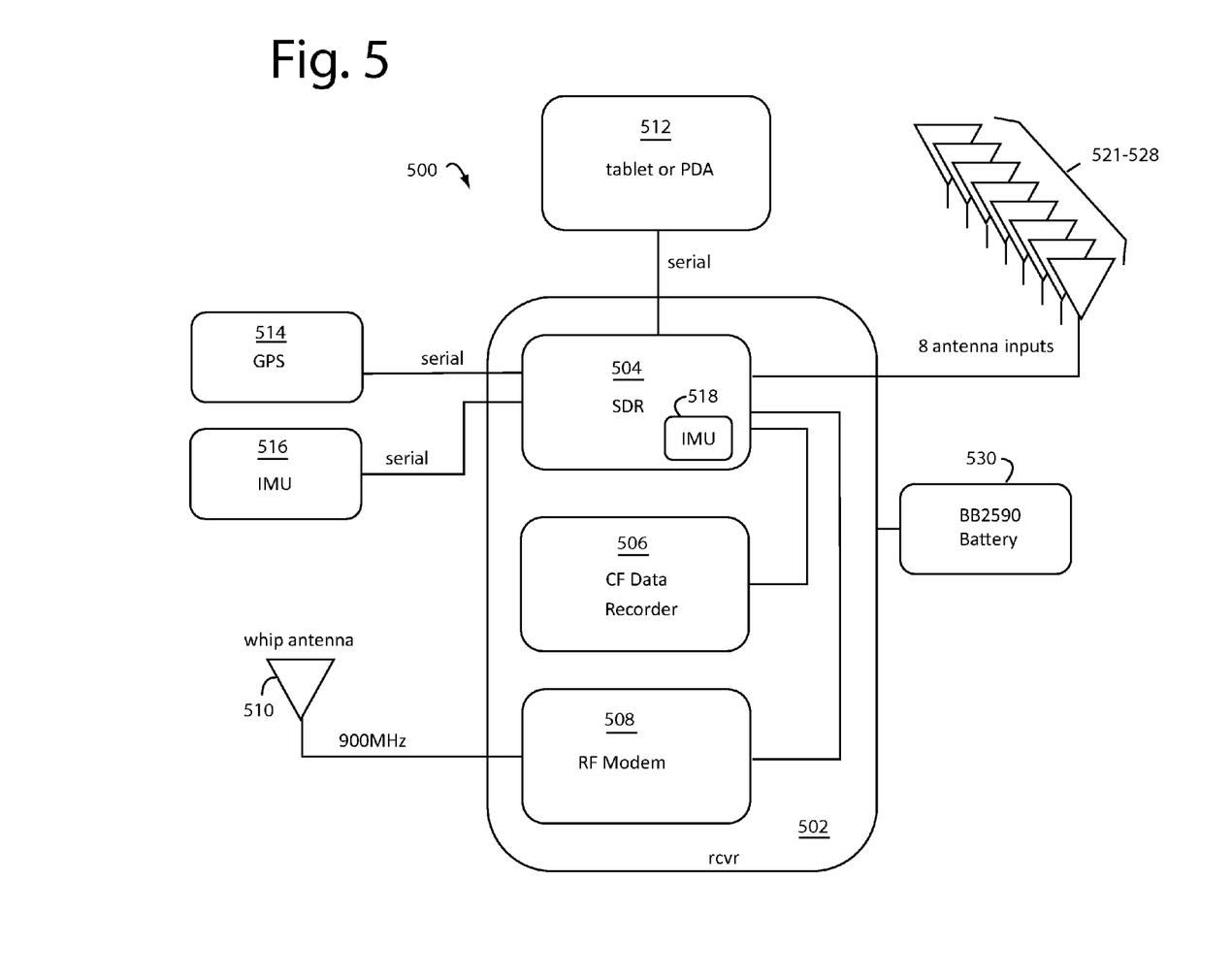
FIG. 5 is a functional block diagram of the EMG receiver of FIGS. 1 and 2A-2C showing additional functions and modules, and a battery that can be worn on the user with a belt.

FIG. 5 represents the electronics included with an EMG receiver, and is referred to herein by the general reference numeral 500. A receiver assembly 502 is shown as an electronics assembly 410 in FIGS. 4A and 4B. Such includes a software defined radio (SDR) 504, a compact flash (CF) data recorder 506, and a radio frequency (RF) modem 508 to support a telemetry link. A whip antenna 510 connects to the RF modem. A touchscreen type tablet or PDA 512 running WINDOWS operating system communicates with the SDR 504 over a serial RS-232 type connection. A standard GPS navigation receiver 514 also communicates with SDR 504 over its own serial RS-232 type connection. And an external inertial navigation unit 516 has a serial RS-232 type connection to SDR 504. SDR 504 may have a built-in inertial navigation unit 518.

Tablet 512 includes software programming instructions to gather signal measurements provided by the SDR 504 and to interpret and display the results as underground targets of various characters. Tablet 512 includes a graphical user interface for a user to enter variables and preferences, and to control the collection, storage, and interpretations of signals returned from underground targets. In some cases the targets may be plotted on a map with the assistance of GPS receiver 514.

Eight antenna inputs 521-528 are possible with SDR 504, but only two would generally be used in an EMG application at any one time. Three for a triple EMG receiver as in FIG. 8.

In one example, particular pairs of antenna inputs 521-528 are reserved for VMD or HMD use, or the different LF, MF, and HF frequency ranges. SDR 504 would assign appropriate processing algorithms to each input and auto-select the ones that had antennas attached to them.

SDR 504 is principally constructed with Analog Devices AD9271 octal LNA/VGA/AAF/ADC and crosspoint switch. Each device includes eight channels of LNA, VGA, AAF, and ADC. The Low noise preamplifier (LNA) Input-referred noise=1.1 nV/√Hz @ 5 MHz typical, gain=18 dB, SPI-programmable gain=14 dB/15.6 dB/18 dB, Single-ended input; VIN maximum=400 mV p-p/333 mV p-p/250 mV p-p. It has Dual-mode active input impedance matching Bandwidth (BW)>70 MHz, Full-scale (FS) output=2 V p-p differential. A Variable gain amplifier (VGA) has a Gain range=−6 dB to +24 dB, and Linear-in-dB gain control. An antialiasing filter (AAF) has 3rd-order Butterworth cutoff, and is programmable from 8 MHz to 18 MHz.

Figure 6:
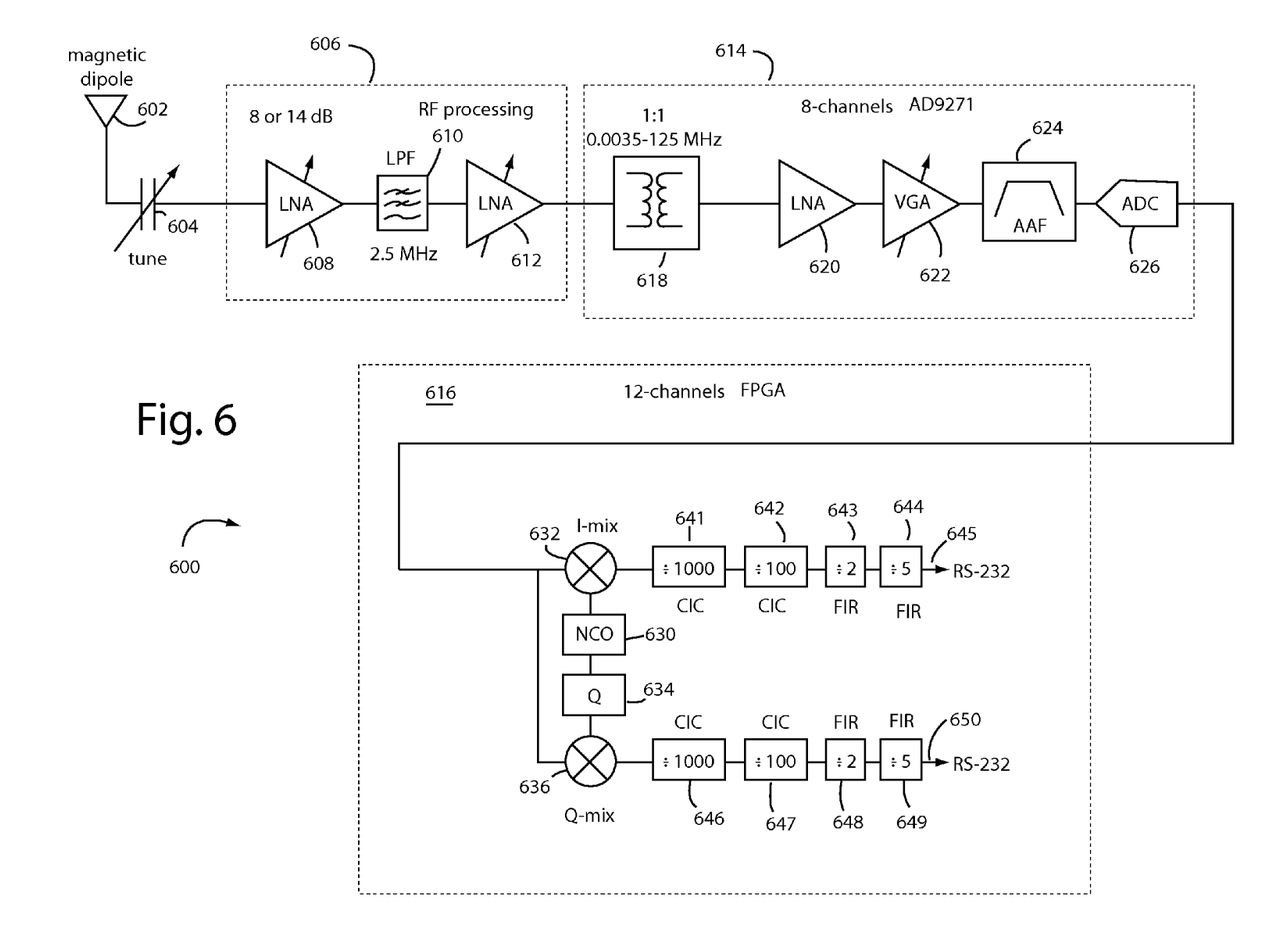
FIG. 6 is a schematic diagram of the radio receiver portion of the EMG receiver of FIGS. 1, 2A-2C, 4A-4B, and 5.

FIG. 6 represents one exemplary EMG receiver channel 600. A typical magnetic dipole antenna 602 is similar to antennas 114 and 116, 212 and 214, and 300. An adjustment 604 allows fine tuning of the resonant frequency and couples signals into a low noise amplifier (LNA) assembly 606 like LNA's 220 and 222, and 320. LNA assembly 606 includes a wideband amplifier 608 like an industry type OPA65X and adjustable for gains of 8-dB or 14-dB, a low pass filter (LPF) 610 with a cutoff frequency of 2.5-MHz, and an LNA 612 like an industry type THS4131 to drive a length of coax cable connecting to a software defined radio (SDR).

Such SDR comprises a digitizer 614 based on Analog Devices AD9271 and a digital signal processor (DSP) 616 implemented with a field programmable gate array (FPGA). A 1:1 input transformer 618 connects to an LNA 620 and a variable gain amplifier (VGA) 622. These are followed by an anti-aliasing filter (AAF) 624 and a 12-bit analog-to-digital converter (ADC) 626. A numeric controlled oscillator (NCO) 630 provides an in-phase local oscillator frequency for an in-phase (I) mixer 632. A 90-degree phase shifter 634 provides a quadrature reference frequency for a Q-mixer 636. A series of cascaded integrator comb (CIC) finite impulse response (FIR) filters 641-645 produces a I-type serial output 645 with an RS-232 interface. Another series of CIC FIR filters 646-649 produces a Q-type serial output 650 also with an RS-232 interface. These serial outputs connect to a tablet or PDA, e.g., 512 in FIG. 5, for further processing and display results.

The system can be used with a variety of processing algorithms, including correlation of the signals from one element with another at a variable time-offset, as well as another that compares the direction of the derivative of the signal at each antenna.

It is possible to use multiple elements in multiple simultaneous orientations.

The EMG system is setup by selecting an appropriate operating frequency for the system, LF, MF, or HF. The best operating frequency is a function of the soil conductivity, which depends on soil type and "skin depth". The skin depth is the distance at which an electromagnetic wave penetrating the soil has decayed to 1/e, or 36.8 percent, of its original amplitude.

The appropriate operating frequency to use for an application dictates which sets of Tx and Rx antennas should be used. Estimates are used for the survey conditions, e.g., soil type and probably target depths. Four general types of soils in the following skin depth table have distinct ranges of conductivities.

Once the column with the type of soil present is determined, the approximate depth of the survey will be just below in the column. The row with the closest match to the depth is used to find an optimum EMG operating frequency in the first column. An air-core transmit antenna that matches the frequency is selected, as well as the EMG receiver antennas. For example, if the survey is being conducted in sand with a skin depth of 117 feet, the 200-kHz transmit loop antenna should be used for optimum performance.

Skin Depth Table.

| | Conductivity (Resistivity) | | | |
|---|---|---|---|---|
| Frequency (kHz) | Clay 0.01 (100) | Clay-Silt 0.0067 (150) | Silt 0.0003 (333) | Sand 0.001 (1,000) |
| | Skin Depth (feet) | | | |
| 2 | 369 | 451 | 674 | 1,167 |
| 20 | 117 | 143 | 213 | 369 |
| 80 | 58 | 71 | 107 | 185 |
| 200 | 37 | 45 | 67 | 117 |

Primary, electromagnetic (EM) waves will interact with underground conductive structures to create secondary EM waves that are detectable on the earth's surface with a gradiometer. The electromagnetic gradiometer (EMG) survey system is a tool that can generate subsurface geophysical imaging capabilities with greater sensitivity, range (distance), and flexibility than existing instrumentation. In efforts using local radio sources, EM gradiometry has been shown to be a promising technique. The synchronized EMG instrumentation is a narrow-band receiver that can discriminate against the spectra noise components and operate in the low ionosphere-earth waveguide noise band, thus maximizing the detection threshold sensitivity of the instrumentation. The EMG capitalizes on its high-threshold detection sensitivity to secondary EM waves in the ELF/VLF bands. Synchronization to the primary wave in the ELF/VLF bands enables very narrow-band detection with threshold detection sensitivity in the picotesla range.

This system has achieved two important advantages in underground conductor (UGC) detection. First, the magnitude of the scattered secondary wave from the UGC infrastructure increases as frequency decreases; thus, waves in the ELF/VLF bands have a significant advantage in the UGC detection. Second, the attenuation rate of EM waves in the ELF/VLF bands through soil/rock is very low so that deeply buried structures can be illuminated and detected. The structures may be empty passageways or may contain electrical conductive structures serving the utility and ventilation needs.

Equation B-1 defines the relationship between skin depth ($\delta$), permeability ($\mu_0$), conductivity ($\sigma$), and frequency (f). Table B-1 provides the calculated results.

$$\delta = \sqrt{\frac{2}{\mu_0 \sigma \omega}} = \frac{1}{\sqrt{\mu_0 \sigma \pi f}} \tag{B-1}$$

The air-core transmit antenna characteristics are analyzed. The antenna is connected to the output of a switched bridge power amplifier. The radiated power, in air, generated by the antenna is determined from $$P_R = R_R \times I^2 \tag{B-2}$$

where
  $P_R$=radiated power,
  $R_R$=radiation resistance,
  I=maximum sinusoidal current.
The radiation resistance of air-core, N-turn loop is given by:

$$R_R = N^2 \left( 31,000 \frac{\pi^2 A^4}{\lambda^4} \right) \tag{B-3}$$

where
  N=number of turns,
  A=area of loop (length×height) or ($\pi \times radius^2$),
  $\lambda$=free-space wavelength (speed of light÷operating frequency).
The 30-inch diameter air-core loop antenna has the following range of properties shown in Table B-1.

Summary of Small Loop Transmit Antenna Characteristics.

$$A = \pi \left( \frac{15}{39.37} \right)^2 = 0.456 \text{ m}^2$$

30-in.-diameter loop

| f | $\lambda$ | N | $|I|_{Measured}$ | $R_R$ | $P_R$ |
|---|---|---|---|---|---|
| 2 kHz | 150 km | 120 | 2.5A | 3.76E−13 Ω | 2.4 pW |
| 20 kHz | 15 km | 20 | 2.0A | 1.05E−10 Ω | 420 pW |
| 80 kHz | 3.75 km | 20 | 2.0A | 2.68E−08 Ω | 0.1 pW |
| 200 kHz | 1.5 km | 10 | 1.6A | 2.61E−07 Ω | 0.7 µW |

Figure 7:
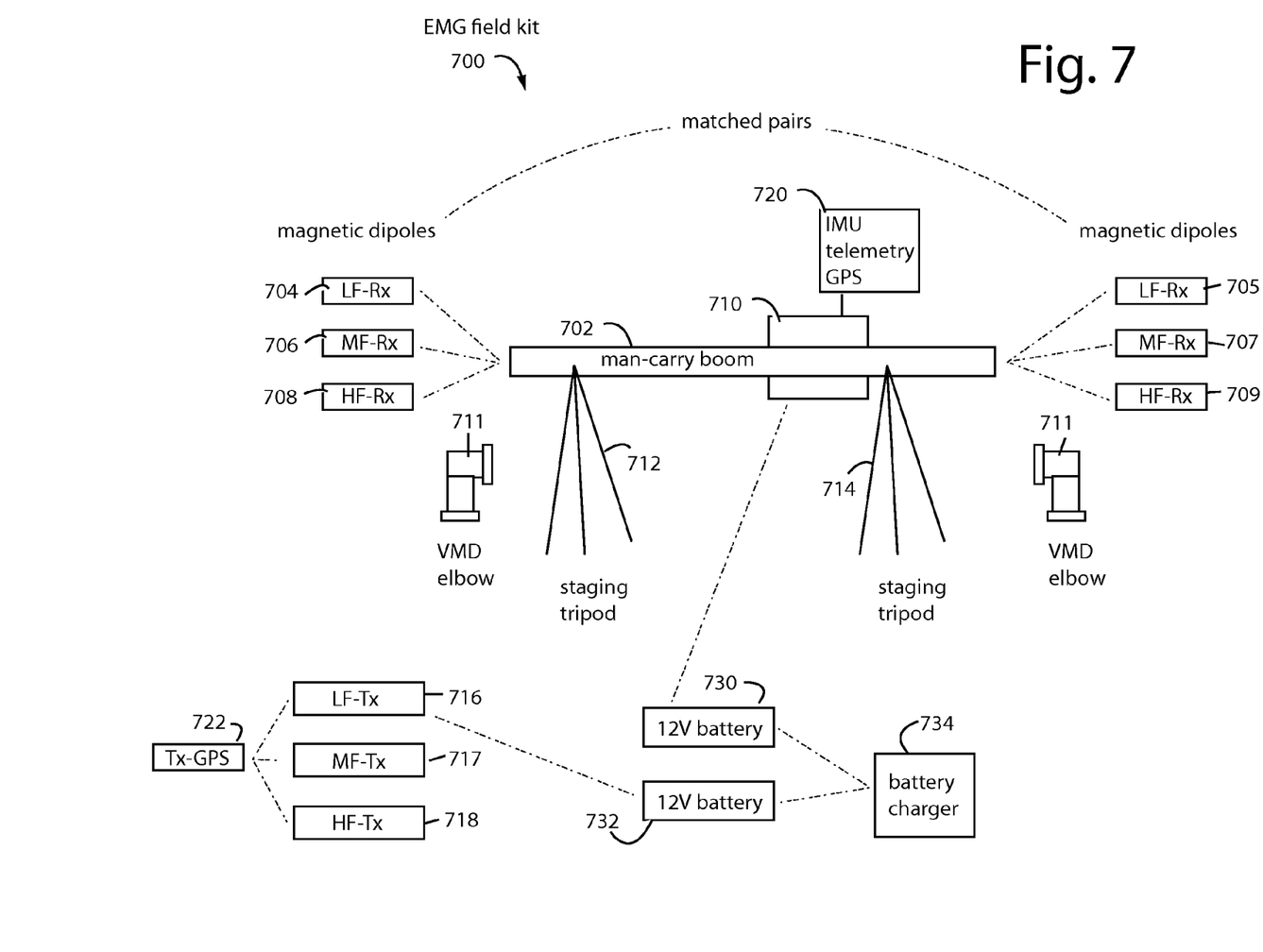
FIG. 7 is an illustration intended to show the entire contents of an EMG system field kit with all the optional antennas and support pieces.

FIG. 7 represents an electromagnetic gradiometer (EMG) survey kit 700 that includes a lightweight man-carry boom 702 about ten feet long. Matched pairs of magnetic dipole antennas 704+705, 706+707, and 708+709 are attached at each end. These are connected to a differential EMG receiver 710 able to make measurements in the picoTesla range. Elbows 711 allow the pairs of magnetic dipole antennas to be used in vertical mode.

A pair of staging tripods 712 and 714 allow the man-carry boom 702 to be prepared for field use and assist the user in positioning themselves under a shoulder sling.

One of three possible types of air core transmitter loop antennas and a low frequency square wave generator 716-718 are spotted nearby a survey site on the ground surface. The transmitters continuous wave radio emissions will illuminate any underground conductive structures with its primary electric field waves. These in turn will reradiate near field magnetic waves that can be detected by the EMG receiver 710 while walking around in a search area on the ground surface.

GPS navigation receivers 720 and 722 are used to locate and log the changing positions of the EMG receiver and stationary loop transmitter. A transmitter (Tx) battery 730 and a receiver (Rx) battery 732 are rechargeable by a battery pack 734.

In one embodiment, the Tx comprises a 20-kHz loop antenna and an 80/200-kHz loop antenna, a transmitter control box, a connecting cable, and a battery pack. Which loop antenna is appropriate for use in a given situation depends on estimates of the soil conductivity and target depths.

The transmitter control box has four, two-position toggle switches. One turns the power on/off, two are used to set the operating frequency to 4/20/80/200-kHz, and the fourth is a momentary type used to cycle the transmitter loop antenna current down in steps.

The particular frequency selected on the transmitter control box is one chosen by the user with the Skin Depth Table above in an initial site setup. The choice of transmitter loop antenna to use is the one that matches the frequency selected with the toggle switches. A coaxial cable with F-connectors is used to connect the transmitter loop antenna to the control box.

When the transmitter control box is first turned on with its power switch, the transmit loop antenna current will initialize at its design maximum. The transmit loop antenna current will display in an analog current meter on the control box panel. The fourth, momentary toggle switch is cycled up and down repeatedly to step the transmit loop current down to an appropriate level as read from the Table above.

Stepping the transmit loop antenna current down to its minimum level requires fourteen steps. Each time the switch is cycled up and down, the transmit loop antenna current will decrease by a predetermined amount. If the transmit loop antenna current reaches minimum, the next switch cycle will cause the transmit loop antenna current to return to maximum.

Setting up an underground detection survey requires planning that is specific to the location. The first step is to look for obvious metallic conductive structures, such as overhead utility lines. A survey method and a survey grid are chosen based on site topography. Typical surveys where the target features are completely unknown will employ a matrix or grid search. Analyzing the data focuses on repeatability and correlation of the data signatures in the survey results.

Many target-detection schemes are possible with magnetic dipole transmitters and receivers. A single configuration that works in all applications is not plausible. Each configuration has its advantages and disadvantages, and our body of field tests has educated us as to the most appropriate configurations to start with for each situation.

The two basic EMG-instrumentation system surveys types are fixed-offset and bi-static. Both depend on measuring the horizontal gradient of the horizontal magnetic field. The transmitter antenna can be a loop antenna laid flat on the surface for a vertical magnetic dipole (VMD), or stood up on edge for a horizontal magnetic dipole (HMD).

The horizontal magnetic dipole configuration favors finding conductive structures that are directly beneath the transmitter antenna, diagonally offset conductive structures, and conductive structures that are many earthen skin depths away.

The vertical magnetic dipole configuration favors finding conductive structures that are offset by right angles. Coupling will be poor for conductive structures that are directly beneath the transmitter antenna.

The direct EM waves from the transmitter must be low enough in signal level to be rejectable by the EMG receiver antennas. A certain amount of rejection is inherent in the design of the EMG receiver. The actual signal levels that reach the EMG receiver are influenced by the relative locations, orientations, and transmitter power level.

Nevertheless, the receiver needs a good enough sample of the direct signal from the transmitter to use as a source of frequency synchronization.

| Typical Transmitter to Receiver Separation Distances | | | | | |
| --- | --- | --- | --- | --- | --- |
| TX loop size | operating frequency | TX loop Current (amps) | HMD type Rx ant to TX Separation (feet) | VMD type Rx ant to TX Separation (feet) | magnetic level (dB) |
| 30" | 2 kHz | 2.6 | 400' to 450' | 450' to 500' | 125 |
| 30" | 20 kHz | 2.75 | 300' to 350' | 350' to 400' | 125 |
| 30" | 80 kHz | 2.25 | 50' to 100' | 100' to 150' | 125 |
| 10' | 80 kHz | 1.75 | 75' to 125' | 150' to 200' | 125 |
| 30" | 200 kHz | 1.25 | 75' to 125' | 150' to 200' | 125 |
| 10' | 200 kHz | 1.4 | 125' to 175' | 175' to 22'5 | 125 |

In a fixed-survey mode, the EMG receiver measures the magnetic gradients at predetermined intervals on a baseline orthogonal to the buried target conductor. The transmitter loop antenna is placed at a fixed location, with the plane of the loop antenna parallel to the ground surface.

During a bi-static survey, the transmitter loop antenna is moved along a parallel path with the EMG receiver and kept abeam of it by a constant distance. The objective is to walk the two across the lay of the target conductor. The EMG receiver is used to measure the magnetic gradients at predetermined intervals along a baseline. A sharp change in those magnetic gradient readings will be observed at a point the EMG receiver passes zenith of the target conductor.

When surveying very large, open areas, keep in mind the optimum distance between the TX antenna and the RX traverse line is frequency dependent. Typical transmitter to receiver separation distances are listed in the Table.

If the TX antenna and the RX antennas are too far apart, the RX antennas cannot synchronize to the primary signal. The TX signal strength is conveniently indicated by a sync-level value read at the RX. The sync level should not exceed 1,200 mV/meter. A sync level that is too high usually implies that the TX antenna must be moved farther away.

If the TX antenna is too close to the EMG receiver, the receiver signals will be seen to increase significantly as it approaches the transmitter, and fall off significantly as it moves away. This reveals the RX is not able to cancel out enough of the primary transmitter signal at its nearest approaches. Conversely, the sync level value should not be allowed to fall below a reading of 200-mV/meter at the farthest away points. The sync level will be roughly inversely proportional to transmitter signal strength.

A circular grid search pattern can be used for surveying an unfamiliar area for underground target conductive structures. How many circles or arcs will be needed to cover the survey area are decided. There is an optimum distance between the TX antenna and the midpoint of the RX traverse on each side of the circle.

Figure 8:
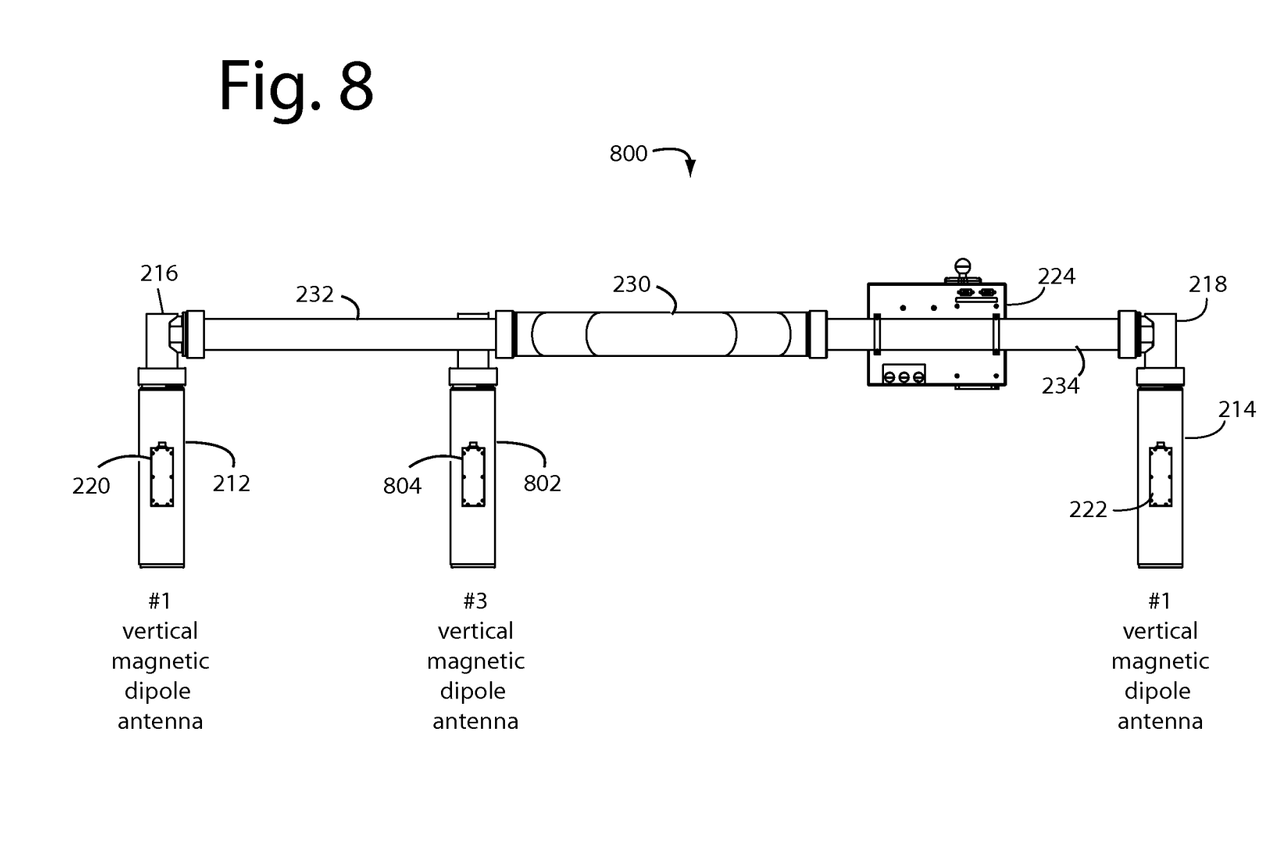
FIG. 8 is a side view of a triple vertical magnetic dipole antenna equipped EMG receiver.

FIG. 8 represents a triple vertical magnetic dipole antenna type of EMG receiver 800. It is essentially the same as EMG receiver 200 as shown in FIG. 2A, except with the addition of a third antenna 802 and a third LNA 804. The magnetic dipole antennas 212, 214, and 802 are matched with one another to provide the same responses to magnetic field inputs.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A mobile electromagnetic gradiometer (EMG) receiver, comprising:
   a man-carry boom about ten feet long and including pipe fittings for the rigid mounting of antennas;
   a differential EMG receiver that takes magnetic field measurements from signals provided from at least two separated antennas connected to a respective input, and that interprets the magnetic field measurements as variously characterized underground targets, and that is mounted off of a longitudinal center on the man-carry boom that allows the center of gravity to be balanced with a user shoulder strap and sling;
   a matched pair of magnetic dipole antennas mechanically attached and rigidly supported at each end of the man-carry boom, and each electrically connected to a said respective input of the differential EMG receiver; and
   an output device mounted on the man-carry boom to visually display to a user the relative locations and characters of underground conductor targets as interpreted from magnetic field measurements collected by the differential EMG receiver.

2. The mobile electromagnetic gradiometer (EMG) receiver of claim 1, further comprising:
   a telescoping and locking device incorporated into the man-carry boom, and that enable the whole to be packed up and transported.

3. The mobile electromagnetic gradiometer (EMG) receiver of claim 1, further comprising:
   a shield screen incorporated in each of the matched pair of magnetic dipole antennas that is comprised of a metal grillwork wrapped around a central ferrite core loop antenna;
   wherein, the metal grillwork is longitudinally split to prevent shorting out signals detectable by the central ferrite core loop antenna.

4. The mobile electromagnetic gradiometer (EMG) receiver of claim 1, further comprising:
   a foam potting incorporated completely within each of the matched pair of magnetic dipole antennas.

5. The mobile electromagnetic gradiometer (EMG) receiver of claim 1, further comprising:
   at least one of a GPS navigation receiver, inertial navigation instrument, or survey total station providing for high accuracy position measurements of the mobile electromagnetic gradiometer (EMG) receiver.

6. The mobile electromagnetic gradiometer (EMG) receiver of claim 1, further comprising:
   an independent, detached transmitter and antenna providing for a source of continuous wave generation while laid on the ground surface to radio illuminate said underground conductor targets.

7. The mobile electromagnetic gradiometer (EMG) receiver of claim 1, further comprising:
   a plurality of matched pairs of magnetic dipole antennas having different ranges of preferential operation frequencies, wherein each are interchangeably and mechanically attachable and rigidly supportable at each end of the man-carry boom, and each are electrically connectable to a respective input of the differential EMG receiver.

8. The mobile electromagnetic gradiometer (EMG) receiver of claim 7, wherein which particular ones of the plurality of matched pairs of magnetic dipole antennas are attached to the respective inputs of the differential EMG receiver according to the transmitter frequency of a local source of continuous radio waves and the nature of the local soils as being characterized by clays, silts, sands, cobbles, or mixtures.

9. The mobile electromagnetic gradiometer (EMG) receiver of claim 1, further comprising:
   a number of right angle pipe elbow adapters that rigidly support the magnetic dipole antennas each in a vertical orientation draping from the man-carry boom.

10. A mobile electromagnetic gradiometer (EMG) receiver comprising:
    a man-carry boom about ten feet long and including pipe fittings for the rigid mounting of antennas;
    a differential EMG receiver that takes magnetic field measurements from signals provided from at least two separated antennas connected to a respective input, and that interprets the magnetic field measurements as variously characterized underground targets, and that is mounted off of a longitudinal center on the man-carry boom that allows the center of gravity to be balanced with a user shoulder strap and sling;
    a matched pair of magnetic dipole antennas mechanically attached and rigidly supported at each end of the man-carry boom, and each electrically connected to said respective input of the differential EMG receiver;
    an output device mounted on the man-carry boom to visually display to a user the relative locations and characters of underground conductor targets as interpreted from magnetic field measurements collected by the differential EMG receiver; and
    a third magnetic dipole antenna mechanically attached and rigidly supported off the middle of the man-carry boom, and connected to a third input of the differential EMG receiver;
    wherein the third magnetic dipole antenna provides measurements that are interpreted and contrasted with those of the other two magnetic dipole antennas.

* * * * *